United States Patent
Ackley et al.

(10) Patent No.: US 8,303,406 B2
(45) Date of Patent: Nov. 6, 2012

(54) SYSTEM AND METHOD FOR PROVIDING AN AUGMENTED REALITY EXPERIENCE

(75) Inventors: Jonathan Michael Ackley, Glendale, CA (US); Christopher J. Purvis, La Crescenta, CA (US); Lanny Starkes Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1017 days.

(21) Appl. No.: 12/313,892

(22) Filed: Nov. 24, 2008

(65) Prior Publication Data

US 2010/0130296 A1     May 27, 2010

(51) Int. Cl.
*A63F 9/24*     (2006.01)
(52) U.S. Cl. ............................................ 463/31; 463/42
(58) Field of Classification Search .................... 463/42, 463/31
See application file for complete search history.

(56) References Cited

U.S. PATENT DOCUMENTS

| | | | |
|---|---|---|---|
| 5,716,281 A | 2/1998 | Dote | |
| 6,179,619 B1 | 1/2001 | Tanaka | |
| 2004/0193441 A1* | 9/2004 | Altieri | 705/1 |
| 2007/0089632 A1 | 4/2007 | Gordon | |
| 2008/0238937 A1 | 10/2008 | Muraki | |

FOREIGN PATENT DOCUMENTS

| | | |
|---|---|---|
| EP | 1 980 999 | 10/2008 |
| JP | 5-186 | 1/1993 |
| JP | 6-218136 | 8/1994 |
| JP | 7-155474 | 6/1995 |
| JP | 2005-537974 | 12/2005 |
| JP | 2006-665 | 1/2006 |
| JP | 2006-75619 | 3/2006 |
| WO | WO 95/27543 | 10/1995 |

OTHER PUBLICATIONS

Toshihiko Wada "Barrier-free spread to a variety of social life" The Hitachi Hyoron vol. 82 No. 6 p. 5 to 10, Japan, Hitachi Hyoronsha, Jun. 1, 2000.

* cited by examiner

*Primary Examiner* — Omkar Deodhar
(74) *Attorney, Agent, or Firm* — Farjami & Farjami LLP

(57) ABSTRACT

There is provided a system comprising a venue including a mapped physical space; a venue management system configured to control real events occurring within the venue; a transporter designed to transport at least one occupant through the mapped physical space along a known path, the transporter configured to move through the mapped physical space under the control of the venue management system; an augmented reality experience server including a virtual venue generator in communication with the venue management system, the virtual venue generator for producing a virtual venue having a virtual representation of the mapped physical space including virtual events and real events occurring within the venue; the augmented reality experience server configured to provide the at least one occupant of the transporter with an augmented sensory perspective including a selective combination of the real events occurring in the venue and the virtual events produced by the virtual venue generator.

22 Claims, 4 Drawing Sheets

SYSTEM AND METHOD FOR PROVIDING AN AUGMENTED REALITY EXPERIENCE

BACKGROUND OF THE INVENTION

1. Field of the Invention

The present invention relates generally to computer enhancement of human perception. More particularly, the present invention relates to providing a computer mediated augmented reality experience.

2. Background Art

Theme parks featuring adventure rides provide a unique blend of physical motion and sensory stimulation that has terrified and delighted generations of recreational thrill seekers. Thanks to advances in technology, those attractions have evolved considerably from the relatively tame Ferris wheels and timber constructed roller coaster rides of the past. It is no longer unusual for a visitor to a modern theme park to encounter sophisticated and lifelike simulation rides providing experiences that appeal to a broad spectrum of rider tastes, and are at once both realistic seeming and fantastic.

For example, a single theme park may offer roller coaster ride attractions and water ride attractions, as well as other distinctive types of thrill ride experiences, in an effort to accommodate a variety of visitor preferences. Moreover, within a particular type of attraction, for example a roller coaster type ride, the experience may be offered as a child's fantasy adventure, such as Casey Jr., be presented with a traditional fairy tale backdrop, as in the Matterhorn bobsled ride, or be given a futuristic theme, like Space Mountain, all of which are presently offered as alternative roller coaster type attractions at the Disneyland theme park in Anaheim, Calif.

The very success of modern theme parks like Disneyland, and Disney World, in Orlando, Fla., highlights the importance of offering in-park adventure experiences exploring themes and having features appealing to a wide audience. A conventional strategy for continuing to meet that challenge is to increase the number and variety of the types of attractions available in-park. Because of their ever increasing emphasis on realism, however, adventure rides utilizing simulated reality environments may be heavily reliant on costly and complex supporting technologies requiring extensive synchronization and substantial data processing capabilities. Due to their cost and resource requirements, there is a practical limit to how many distinct physical attractions of this level of sophistication any single theme park venue can support. Consequently, in order to continue to provide visitors with the diversity of attractions they have come to expect, theme parks may be compelled to find a way to produce more than one distinct adventure experience using a single in-park simulation environment.

A comparatively recent competitor of theme parks for the attention and affection of the thrill seeking public, are computer generated experiences such as networked or online games, and the excitement available from engaging those virtual environments. Typical computer based games and simulations utilize computer graphics to mimic a three-dimensional real-life environment, using the two-dimensional presentation available through a computer monitor or mobile device display screen. Because virtual environments are software based, rather than requiring the combination of software and hardware needed to support a brick-and-mortar theme park attraction, they are considerably less costly to provide. As a result, adventure experiences reliant on virtual environments may be produced more rapidly, in a greater variety, and can be modified with greater ease than is possible for real theme park attractions.

An additional advantage of computer based simulations over their theme park counterparts is the extent to which the experience can be personalized to a single user. For example, while a conventional adventure ride, such as Disneyland's Space Mountain or Indiana Jones Adventure, is substantially the same experience for all riders, a virtual environment might be engaged differently by different users, depending for example, on their skill level, preferences, or history of previous use. As a result, a computer virtual environment may provide an experience that seems more personal, more interactive, and more flexible in response to user preferences, than are most theme park attractions.

Nevertheless, despite their numerous advantages, computer virtual environments are inevitably constrained by their format. Consequently, they often fail to provide the visceral thrill associated with a real adventure ride, arising, for example, from the physical motion produced by the real ride. As a result, conventional solutions to providing simulation environments leave the recreational thrill seeker facing a mutually exclusive choice. On the one hand, he or she can sacrifice realism in favor of the flexibility and variety available through a computer virtual environment. Alternatively, he or she can choose to enjoy the realism available from a sophisticated adventure ride, but have little opportunity to interact with the experience in order to influence the unfolding of events within it.

Thus, although both of the conventional approaches for implementing simulation environments described previously embody desirable aspects, neither optimally provides both sensory richness and verisimilitude. Accordingly, there is a need to overcome the drawbacks and deficiencies in the art by providing a simulation having the realism of physical experience augmented by the sensory richness and power of illusion produced by a computer virtual environment.

SUMMARY OF THE INVENTION

There are provided systems and methods for providing an augmented reality experience, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for providing an augmented reality experience. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 1:
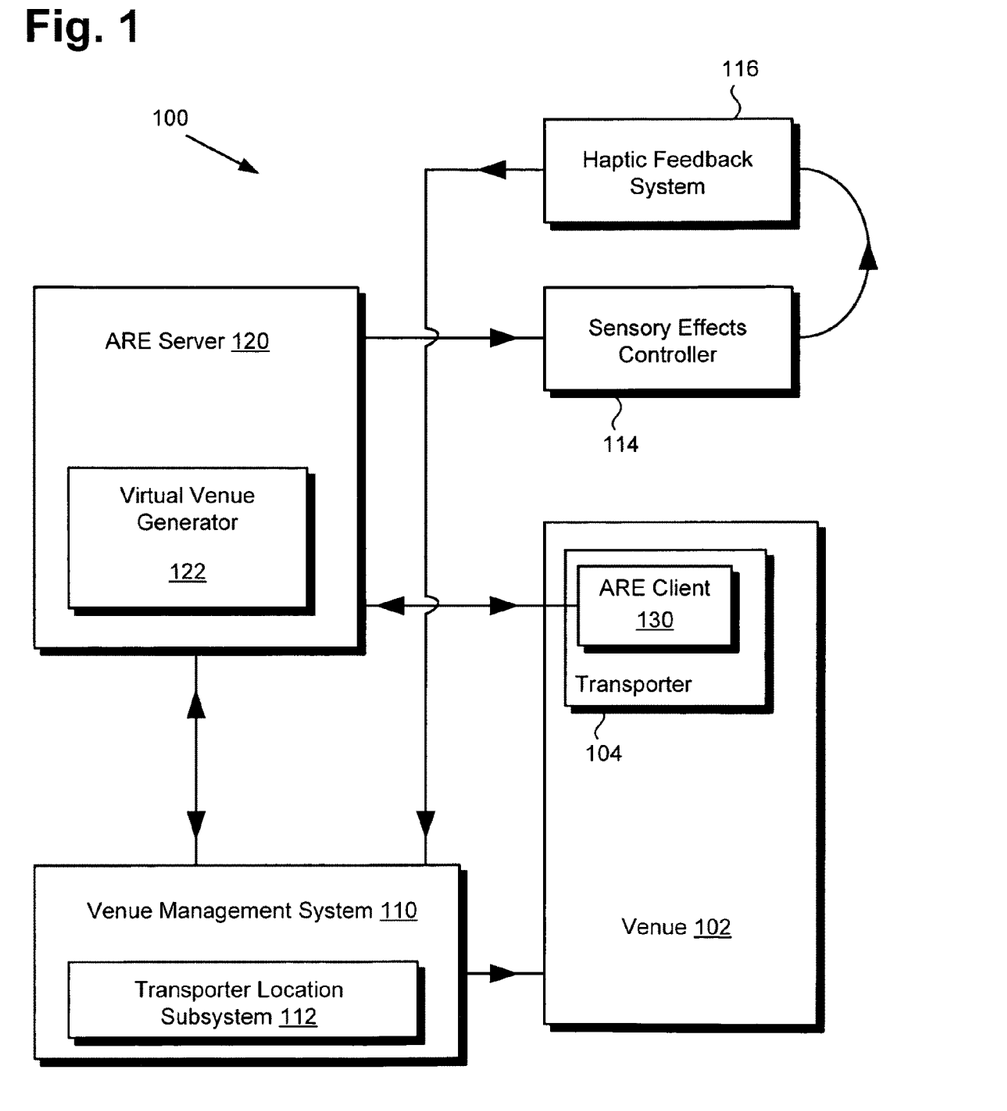
FIG. 1 shows a diagram of a system for providing an augmented reality experience, according to one embodiment of the present invention.

FIG. 1 shows a diagram of an exemplary system for providing an augmented reality experience, according to one embodiment of the present invention. In the embodiment of FIG. 1, system 100 comprises venue 102, venue management system 110, sensory effects controller 114, haptic feedback system 116, and augmented reality experience (ARE) server 120. As shown in FIG. 1, venue 102 includes transporter 104, such as a vehicle, equipped with ARE client 130 in communication with or interactively linked to ARE server 120, which, additionally, hosts virtual venue generator 122. Also shown in FIG. 1 is transporter location subsystem 112, in venue management system 110. The arrows shown in FIG. 1 are provided to indicate the direction of data flow for the embodiment of system 100, and are merely illustrative. Other embodiments may include fewer or more constituent elements, may consolidate or further distribute the elements shown in FIG. 1, and/or may be implemented using other configurations for data flow.

Venue 102, which may comprise a theme park attraction such as a roller coaster ride or other type of adventure ride, for example, includes a mapped physical space (not shown in FIG. 1) through or within which transporter 104 can move. Transporter 104, which may be a theme park ride vehicle, such as, for example, a roller coaster car or carriage, is designed to transport one or more vehicle occupants through the mapped physical space of venue 102, along a known path (also not shown in FIG. 1). Transporter 104 may be configured to move through the mapped physical space of venue 102, under the control of venue management system 110. In other embodiments, transporter 104 may be a movable platform that can move riders within a defined space.

In one embodiment, transporter 104 may correspond to an interactive bumper car, or kart racing vehicle, for which a travel path is known by virtue of being detected as the vehicle moves through the mapped physical space. In those embodiments, detection of the known path may result from sensors on transporter 104, and/or sensors provided in the mapped physical space, for example. In another embodiment, a travel path of transporter 104 may be known by virtue of its being a predetermined path, such as where transporter 104 comprises a vehicle restricted to a fixed track or rail line, for instance, and the known path comprises the predetermined fixed course.

As shown in the embodiment of FIG. 1, venue management system 110 is interactively linked to ARE server 120. Virtual venue generator 122, residing on ARE server 120, is configured to produce a virtual venue comprising a virtual representation of the mapped physical space of venue 102. In addition, virtual venue generator 122 is configured to produce virtual events synchronized to real events occurring in venue 102. Virtual events may correspond to real events such as the movement of transporter 104 through the mapped physical space, and/or interactions between the one or more occupants of transporter 104 and venue 102, as recorded by ARE client 130, for example. ARE server 120 is configured to provide the one or more occupants of transporter 104 with an augmented sensory perspective comprising a selective combination or blending of the real events occurring in venue 102 and the virtual events produced by virtual venue generator 122. As a result, system 100 provides the one or more occupants of transporter 104 with an augmented reality experience linked to their transport through venue 102.

Transporter location subsystem 112, shown in FIG. 1 to reside in venue management system 110, is configured to determine the location of transporter 104 in the mapped physical space of venue 102. Although the embodiment of system 100 shows transporter location subsystem 112 as a distinct subsystem of venue management system 110, in other embodiments the functionality provided by transporter location subsystem 112 may be distributed throughout venue management system 110. In those latter embodiments, venue management system 110 may be configured to locate transporter 104 directly, without the participation or presence of transporter location subsystem 112 per se.

Where, as in the system shown in FIG. 1, venue management system 110 includes transporter location subsystem 112, transporter location subsystem 112 may be configured to determine the location of transporter 104 in several ways. For example, in one embodiment in which transporter 104 is restricted to movement on a predetermined path, transporter location subsystem 112 may be configured to determine the location transporter 104 in the mapped physical space of venue 102 according to elapsed time from a start time when transporter 104 begins to move along the predetermined path through venue 102. In another embodiment in which transporter 104 moves along a known path that need not be a predetermined path, transporter location subsystem 112 may be configured to determine the location of transporter 104 according to data received from a plurality of sensors (not shown in FIG. 1) situated in venue 102 and/or provided on transporter 104.

The embodiment of FIG. 1 further includes sensory effects controller 114 and haptic feedback system 116. As shown in system 100, sensory effects controller 114 and haptic feedback system 116 receive input from ARE server 120, and are in communication with venue management system 110. Sensory effects controller 114, under the direction of ARE server 120, may be configured to produce audio and/or visual effects, generate odors or aromas, and provide special effects such as wind, rain, fog, and so forth, in venue 102. Sensory effects controller 114 may provide those effects to produce real events in venue 102 corresponding to virtual events produced by virtual events generator 122, as well as to produce real events corresponding to interaction with the one or more occupants of transporter 104 with venue 102, for example.

Haptic feedback system 116 may be configured to produce tactile effects in order to generate real events in venue 102 simulating the consequences of virtual events occurring the virtual venue produced by virtual venue generator 122. The tactile effects produced by haptic feedback system 116 may result, for example, from displacement, rotation, tipping, and/or jostling of transporter 104, to simulate the consequences of virtual events produced by virtual venue generator 122. Although in the embodiment of FIG. 1 sensory effects controller 114 and haptic feedback system 116 are shown as distinct elements of system 100, in other embodiments the functionality provided by sensory effects controller 114 and haptic feedback system 116 may be provided by a single control system. In still other embodiments, sensory effects controller 114 and haptic feedback system 116 may be subsumed within venue management system 110.

Figure 2:
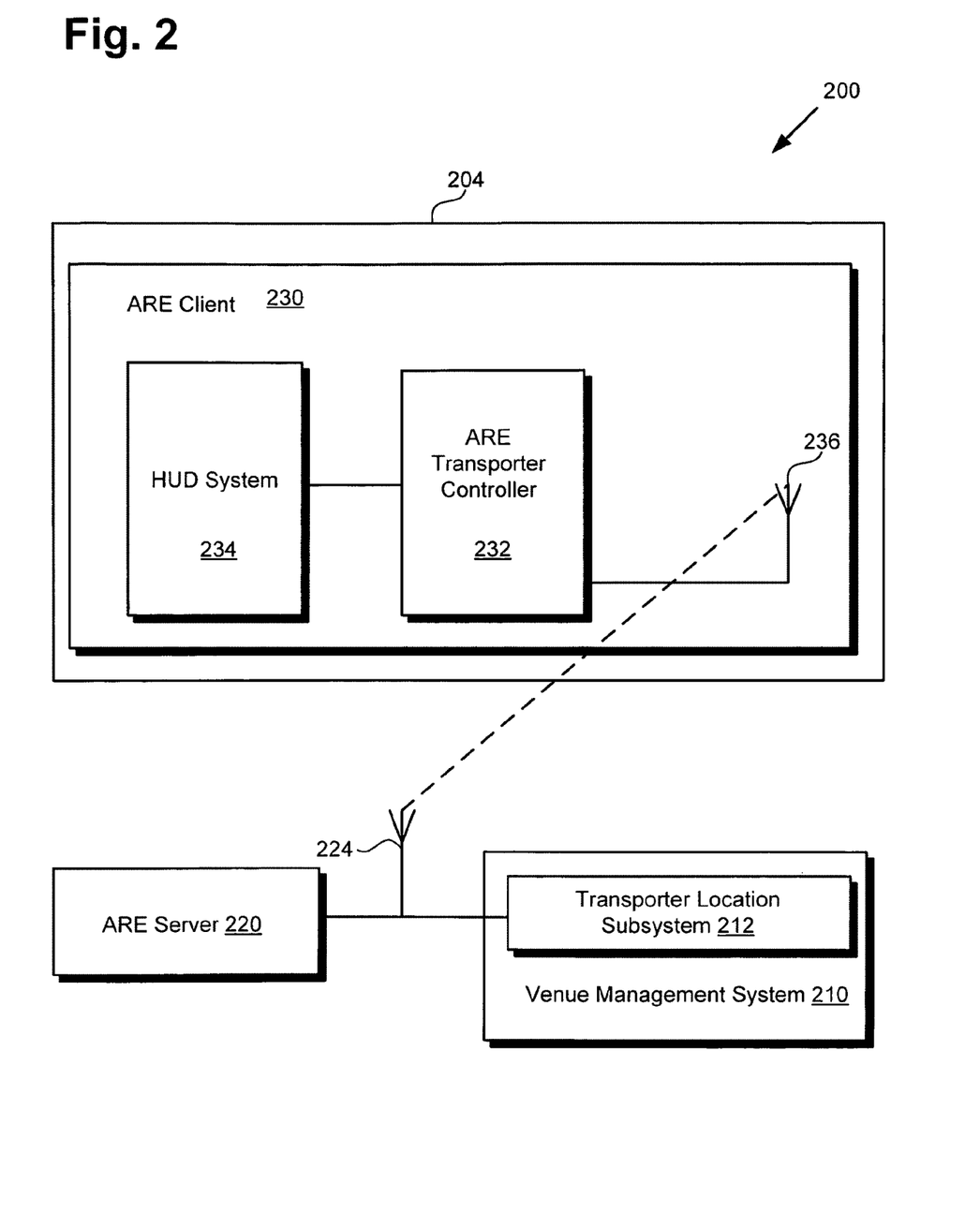
FIG. 2 shows a diagram of an augmented reality client system interacting with other elements of a system for providing an augmented reality experience, according to one embodiment of the present invention.

Turning now to FIG. 2, FIG. 2 shows diagram 200 of augmented reality client 230 interacting with other elements of a system for providing an augmented reality experience, according to one embodiment of the present invention. Diagram 200, in FIG. 2, shows transporter 204 equipped with ARE client 230 and transporter antenna 236. ARE client is in wireless communication with ARE server 220 and transporter location subsystem 212 residing in venue management system 210, through system antenna 224. Transporter 204 equipped with ARE client 230, venue management system 210 including transporter location subsystem 212, and ARE server 220, in FIG. 2, correspond respectively to transporter 104 equipped with ARE client 130, venue management system 110 including transporter location subsystem 112, and ARE server 120, in FIG. 1. As shown in FIG. 2, ARE client 230 comprises ARE transporter controller 232 and head-up display (HUD) system 234.

ARE transporter controller 232 may be configured to control the movement of transporter 204, as well as sounds and other sensory effects produced by output devices (not shown in FIG. 2) located on transporter 204, in response to instructions from ARE server 220 and/or venue management system 210. In addition, ARE transporter controller 232 may provide data to transporter location system 212 to assist in a determination of the location of transporter 204 within a venue controlled by venue management system 210.

As was true for transporter 104, in FIG. 1, transporter 204 in FIG. 2 may be designed to transport at least one transporter occupant along a known path through a venue corresponding to venue 102, in FIG. 1, under the control of venue management system 210. In the embodiment of FIG. 2, HUD system 234 is installed on transporter 204 and is configured to provide the at least one occupant of transporter 204 with an augmented reality experience. In one embodiment, HUD system 234 comprises a beam splitter to facilitate direct visual perception of the augmented reality experience by the occupant of transporter 204. In that embodiment, the beam splitter may be utilized to selectively combine or blend images corresponding to virtual events, with real images directly perceivable by the transporter occupant, to provide the transporter occupant with an augmented sensory perspective, thereby providing the augmented reality experience.

According to another embodiment, HUD system 234 is configured to selectively blend virtual and real images and render them concurrently on a viewing screen placed and oriented so as to produce a head-up display. In some embodiments, substantially the same augmented reality experience is provided to all occupants of transporter 204. In other embodiments, however, each individual occupant may be provided with a unique augmented reality experience based on that occupant's personal interactions with the venue controlled by venue management system 210 and the virtual venue produced by ARE server 220.

Figure 3:
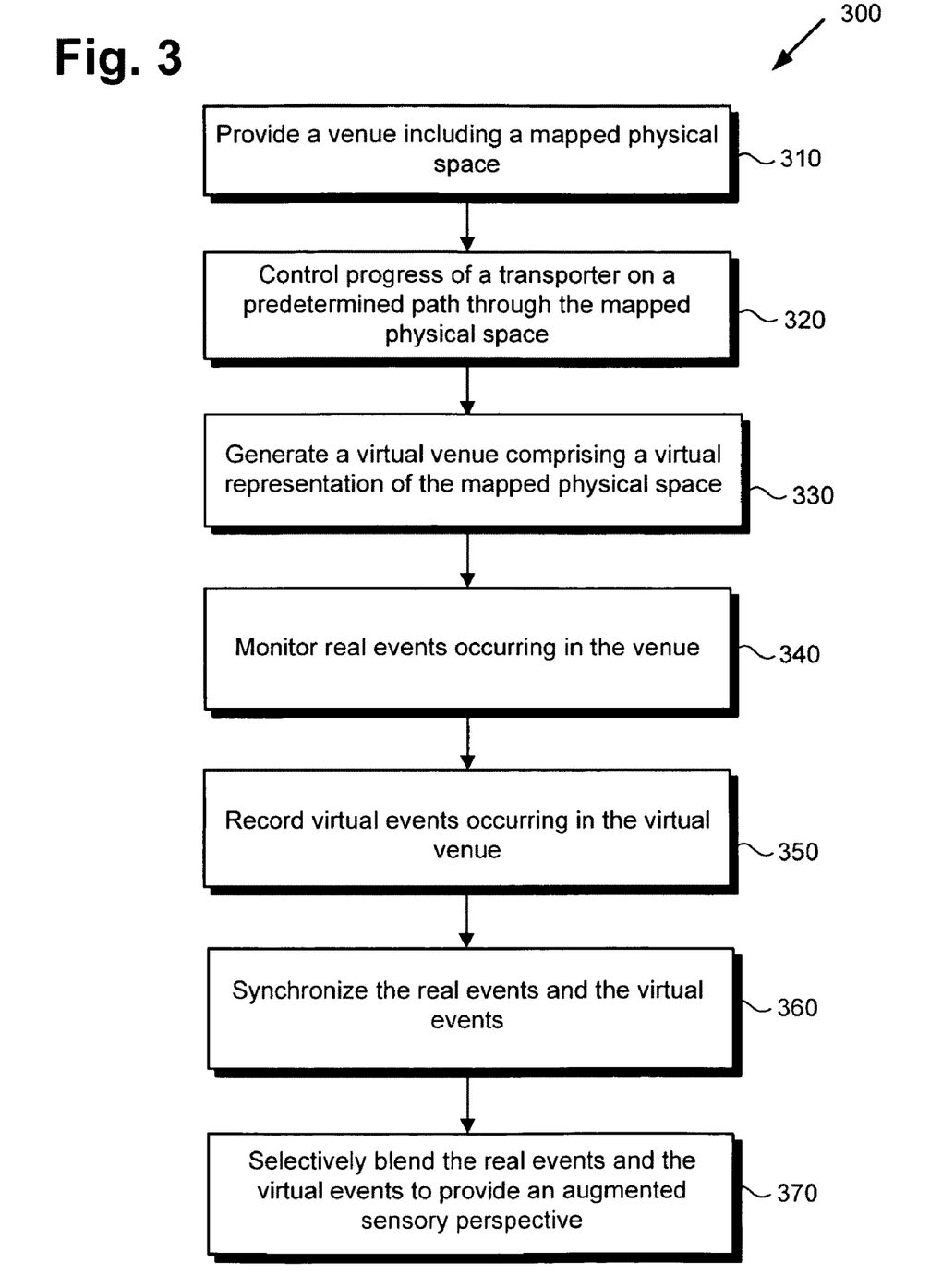
FIG. 3 is a flowchart presenting a method for providing an augmented reality experience, according to one embodiment of the present invention.

FIGS. 1 and 2 will now be further described in conjunction with FIG. 3, which presents an example method for providing an augmented reality experience, according to one embodiment of the present invention. Certain details and features have been left out of flowchart 300 that are apparent to a person of ordinary skill in the art. For example, a step may consist of one or more substeps or may involve specialized equipment or materials, as known in the art. While steps 310 through 370 indicated in flowchart 300 are sufficient to describe one embodiment of the present method, other embodiments may utilize steps different from those shown in flowchart 300, or may include more, or fewer steps.

Beginning with step 310 in FIG. 3, step 310 of flowchart 300 comprises providing a venue including a mapped physical space. In order to animate and clarify the discussion of the systems shown in FIGS. 1 and 2, as well as the present example method, let us consider, as a specific embodiment of the disclosed inventive concepts, an outer space themed interactive roller coaster ride/shooting game provided as a theme park attraction. In view of that specific embodiment, and referring to FIG. 1, providing a venue including a mapped physical space in step 310 may be seen to correspond to providing venue 102, which comprises the physical setup for the roller coaster ride itself, i.e. track, roller coaster carriages, special effects generating equipment, and so forth.

Venue 102 represents a controlled environment in which the features of objects within the venue are known, and the locations of those objects are mapped. For example, in the present specifically evoked theme park attraction embodiment, the location, size, and spatial orientation of video monitors configured to provide visual effects for the ride may be fixed and known. As another example, the location and performance characteristics of special effects generators, such as wind machines, audio speakers, interactive objects, and the like, may be predetermined and mapped.

The example method of flowchart 300 continues with step 320, which comprises controlling progress of a transporter through the mapped physical space. Continuing with the example of a theme park attraction roller coaster ride/shooting game, the transporter described in step 320 may be seen to correspond to a theme park ride transporter, such as a roller coaster car or carriage, for example. According to the present method, the transporter is configured to transport at least one occupant through the mapped physical space along a known path. For illustrative purposes, however, let us assume that each ride transporter is configured to hold two occupants, and that the transporters transport their respective two occupants along a predetermine path corresponding to the roller coaster track.

Referring once again to FIG. 1, the transporter of step 320 in flowchart 300 may be seen to correspond to transporter 104, in FIG. 1. The progress of transporter 104 through the mapped physical space comprised by venue 102 may be controlled by venue management system 110. As may be apparent from review of steps 310 and 320, because the transporter is moving in a controlled and predictable way along a known path through a mapped physical space, various aspects of the transporter motion through the venue, such as it's instantaneous speed, elevation, and direction of motion, for example, may be anticipated with a high degree of accuracy.

Flowchart 300 continues with step 330, comprising generating a virtual venue comprising a virtual representation of the mapped physical space of the real venue provided in step 310. Generating a virtual venue, in step 330, may be performed by virtual venue generator 122 on ARE server 120, for example. In the example of the interactive outer space roller coaster ride/shooting game presently under consideration, ARE server 120 would be configured to host a computer virtual simulation of passage of transporter 104 through the mapped physical space of venue 102.

As a result of step 330, two complementary realities corresponding to passage of transporter 104 through venue 102 are created. One reality, the physical reality of the roller coaster ride in venue 102, is created by the real events occurring during transport of the transporter occupants through the venue. The second reality is a computer simulated version of the roller coaster ride/shooting game that is generated so as to substantially reproduce the ride experience in virtual form. Consequently, the occupants of transporter 104 may enjoy the real visceral excitement of motion on a roller coaster, while interacting with virtual representations of objects in the venue. Those virtually represented objects may be virtual recreations of actual physical objects in venue 102, and/or purely virtual creations, and/or virtually enhanced representations of real objects in venue 102.

One significant advantage of utilizing both a real physical venue and a corresponding virtual venue is that a single physical venue may be virtually modified and enhanced to provide a variety of sensory experiences to a consumer. For example, artful use of video screens, sound effects, and staging in the physical venue, together with the nearly limitless environments that may be created virtually, allow the same roller coaster ride apparatus to be used as a space ride, an atmospheric flying ride, or an undersea ride, just to name a few possible variations. As a result, the theme park or other business entity providing the venue is able to support multiple experiences from a single apparatus. Moreover, a user of such a system, such as a theme park visitor or other type of consumer, may be able to select from a variety of stimulating and enjoyable experiences at a single venue.

Continuing with step 340 of flowchart 300, step 340 comprises monitoring real events occurring in venue 102. Returning once again to the outer space roller coaster ride/shooting game example, the occupants of ride transporter 104 may be challenged to destroy as many enemy spacecraft as possible during a ride interval, each enemy spacecraft having an associated point value. The future path of transporter 104 may depend in part on the performance of the transporter occupants with respect to that challenge.

For example, the transporter occupants may use firing controls provided on transporter 104 to score virtual hits on virtual targets included in the virtual venue generated in step 330 and shown by display screens on transporter 104. If the transporter occupants accumulate points exceeding a certain point threshold, transporter 104 may be diverted to an alternative track during a subsequent ride interval. Such opportunities may occur one or more times during the ride, so that the course of events in the venue may depend to some extent on the outcome of virtual events in the virtual venue.

In one embodiment, monitoring real events in the venue may include determining the location of the transporter in the mapped physical space according to elapsed time from a start time when the transporter begins to move along the known path, i.e., from the start of the ride. Alternatively, in one embodiment, monitoring real events in the venue may further comprise tracking the location of the transporter in the mapped physical space, for example according to data received from a plurality of sensors situated in the venue and/or those placed on the transporter. Referring to FIG. 2, monitoring of real events occurring in the venue may be performed by ARE server 220 and/or venue management system 210. In the embodiment shown be diagram 200, for example, data corresponding to progress of transporter 204 through the venue, and/or occupant interactions with the virtual venue generated by ARE server 220 may be transmitted from ARE client 230 to system antenna 224.

Moving to step 350 and continuing to refer to FIG. 2, step 350 comprises recording virtual events occurring in the virtual venue. Step 350 may be performed by ARE server 220, which hosts the virtual venue. Where, for example, virtual events correspond to interactions between an occupant of transporter 204 and a virtual representation of the roller coaster ride/shooting game displayed to that occupant, those events may be communicated from ARE client 230 to ARE server 220 and recorded there.

Continuing with step 360 of flowchart 300, step 360 comprises synchronizing the real events and the virtual events so that the real events can be represented in the virtual venue and the virtual events can be represented in the venue. Synchronizing the real and virtual venues in step 360 enables a substantially seamless overlay of the virtual and real environments provided according to the present method. As a result, the occupant of the ride transporter may engage the virtual venue and affect events in the real venue, while real events in the venue may be represented in real time by corresponding virtual events in the virtual venue. For instance, video screens and speakers bordering the outer space ride could produce images and sounds corresponding to destruction of an enemy spacecraft as a result of a virtual hit achieved by the transporter occupant through interaction with the virtual venue.

In step 370, the real events and the virtual events are selectively blended to provide the occupants of the transporter with an augmented sensory perspective, thereby providing the augmented reality experience. As previously described, the augmented sensory perspective may be produced by the substantially seamless overlay of the virtual reality of the virtual venue and the real events occurring in the physical environment of the venue. In some embodiment, the present method may further comprise providing a head-up display, as shown by HUD system 234 in FIG. 2, enabling the transporter occupant to engage the augmented reality experience in a physical posture adding to the verisimilitude of the augmented sensory perspective.

In one embodiment, the method of flowchart 300 may further comprise utilizing a haptic feedback system, such as haptic feedback system 116 in FIG. 1, to generate real effects in the venue simulating the consequences of virtual effects in the virtual venue. For example, destruction of an enemy spacecraft, in addition to being accompanied by audio and visual effects produced in the venue, may be rendered even more realistic by recoil or jostling of transporter 104 to simulate impact of the shock wave produced by the exploding spacecraft. Analogously, virtual hits by enemy spacecraft on the ride transporter may be accompanied by displacements, rotations, tipping, and the like, produced by haptic feedback system 116.

Returning to our specific scenario in which transporter 104 is transporting two occupants through venue 102, use of a haptic feedback system may result in both transporter occupants enjoying a shared augmented reality experience. In one such embodiment, both transporter occupants may enjoy the same ride events and experience substantially the same virtual venue, so that the interactions of either transporter occupant with the virtual venue is reflected in the augmented reality experience of both occupants. In other embodiments, however, each transporter occupant may be provided with an individual augmented reality experience unique to that occupant. In a simple version of those latter embodiments, for example, two occupants of transporter 104 may both enjoy similar outer space themed roller coaster ride/shooting games, but have their respective augmented sensory perspective shaped by the results of their own individual proficiency in interacting with the virtual venue hosted by ARE server 120. In other embodiments the two transporter occupants, while experiencing a similar set of physical events, may interpret them quite differently by virtue of their being overlaid by substantially different virtual events.

Figure 4:
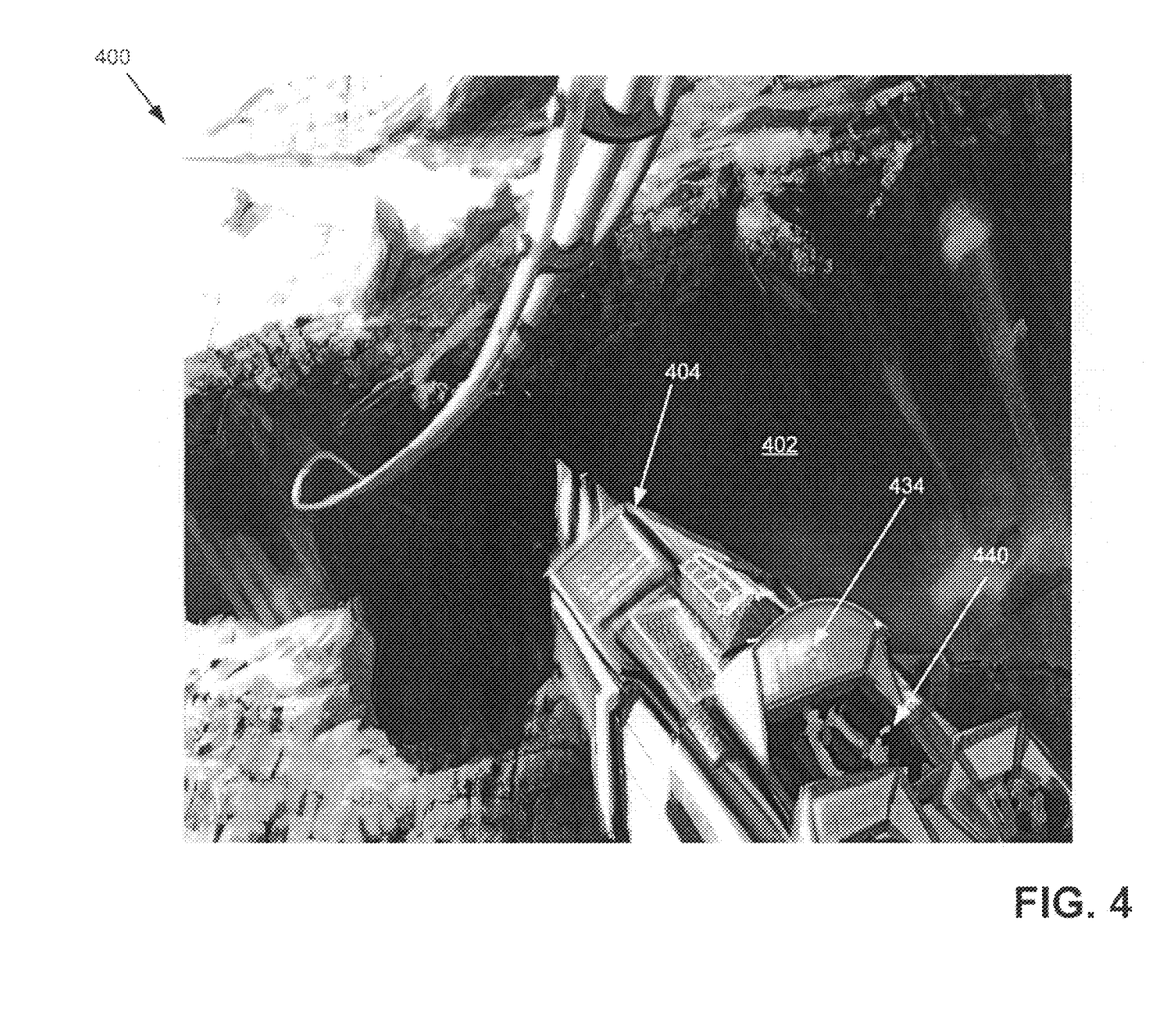
FIG. 4 shows a visual frame representing an exemplary augmented reality experience in the form of a theme park ride, provided according to one embodiment of the present invention.

Turning now to FIG. 4, FIG. 4 shows visual frame 400 representing an exemplary augmented reality experience in the form of the previously described outer space themed roller coaster ride/shooting game, provided according to one embodiment of the present invention. As can be seen from FIG. 4, occupant 440 of transporter 404 is being transported through venue 402, which has been configured to assume the aspect of a space warfare environment. Virtual events and real events are selectively blended and presented to occupant 440 by means of head-up display 434. As a result, occupant 440 is provided with an augmented sensory perspective producing the look and sensation of a real space combat experience.

Thus, the present application discloses systems and methods for providing an augmented reality experience. By providing a venue including a mapped physical space, and controlling the progress of a transporter along a known path through the venue, one embodiment of the present invention enables accurate prediction of transporter position. By further generating a virtual venue comprising a virtual representation of the mapped physical space, one embodiment of the present invention permits synchronization of real events in the venue with virtual events resulting from dynamic interaction of a transporter occupant and the virtual venue. Moreover, by selectively blending the real events and the virtual events to provide an augmented sensory perspective the present solution provides a simulation having the realism of physical experience enhanced by the sensory richness and power of illusion produced by a computer virtual environment.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for providing an augmented reality experience, the system comprising:
    a venue including a mapped physical space;
    a venue management system configured to control real events occurring within the venue;
    a transporter designed to transport at least one occupant through the mapped physical space along a known path, the transporter configured to move through the mapped physical space under the control of the venue management system;
    an augmented reality experience server including a virtual venue generator in communication with the venue management system, the virtual venue generator configured to produce a virtual venue having a virtual representation of the mapped physical space including virtual events and real events occurring within the venue, the augmented reality experience server configured to provide the at least one occupant of the transporter with an augmented sensory perspective including a selective combination of the real events occurring in the venue and the virtual events produced by the virtual venue generator; and
    a haptic feedback system in communication with the venue management system, the haptic feedback system configured to generate real effects in the venue simulating the consequences of virtual events in the virtual venue.

2. The system of claim 1, further comprising a head-up display (HUD) system installed on the transporter, the HUD system configured to provide the at least one occupant of the transporter with the augmented sensory perspective.

3. The system of claim 1, wherein the known path through the mapped physical space comprises a predetermined path.

4. The system of claim 1, wherein the venue management system includes a transporter location subsystem configured to determine the location of the transporter in the mapped physical space.

5. The system of claim 4, wherein the transporter location subsystem is configured to determine the location of the transporter in the mapped physical space according to elapsed time from a start time when the transporter begins to move along a predetermined path.

6. The system of claim 4, wherein the transporter location subsystem is configured to determine the location of the transporter in the mapped physical space according to data received from a plurality of sensors.

7. The system of claim 1, wherein the venue comprises a theme park attraction.

8. The system of claim 1, wherein the transporter comprises a theme park ride transporter.

9. The system of claim 1, wherein the at least one occupant is one of a plurality of occupants of the transporter, and wherein the at least one occupant is provided with an individual augmented reality experience unique to the at least one occupant.

10. A method for providing an augmented reality experience, the method comprising:
    providing a venue including a mapped physical space;
    controlling progress of a transporter through the mapped physical space, the transporter configured to transport at least one occupant through the mapped physical space along a known path;
    generating a virtual venue including a virtual representation of the mapped physical space;
    monitoring real events occurring in the venue;
    recording virtual events occurring in the virtual venue;
    selectively combining the real events and the virtual events to provide the at least one occupant of the transporter with an augmented sensory perspective; and
    utilizing a haptic feedback system to generate real effects in the venue simulating the consequences of virtual events in the virtual venue.

11. The method of claim 10, further comprising providing a head-up display (HUD) system installed on the transporter, the HUD system configured to provide the at least one occupant of the transporter with the augmented sensory perspective.

12. The method of claim 10, wherein the known path through the mapped physical space comprises a predetermined path.

13. The method of claim 10, wherein monitoring real events in the venue includes determining a location of the transporter in the mapped physical space according to elapsed time from a start time when the transporter begins to move along a predetermined path.

14. The method of claim 10, further comprising tracking a location of the transporter in the mapped physical space.

15. The method of claim 14, wherein the tracking is performed according to data received from a plurality of sensors.

16. The method of claim 10, wherein the venue comprises a theme park attraction.

17. The method of claim 10, wherein the transporter comprises a theme park ride transporter.

18. The method of claim 10, wherein the at least one occupant is one of a plurality of occupants of the transporter, and wherein the at least one occupant is provided with an individual augmented reality experience unique to the at least one occupant.

19. A system for providing an augmented reality experience, the system comprising:
- a venue including a mapped physical space;
- a venue management system configured to control real events occurring within the venue;
- a transporter designed to transport at least one occupant through the mapped physical space along a known path, the transporter configured to move through the mapped physical space under the control of the venue management system;
- an augmented reality experience server including a virtual venue generator in communication with the venue management system, the virtual venue generator configured to produce a virtual venue having a virtual representation of the mapped physical space including virtual events and real events occurring within the venue, the augmented reality experience server configured to provide the at least one occupant of the transporter with an augmented sensory perspective including a selective combination of the real events occurring in the venue and the virtual events produced by the virtual venue generator; and
- wherein the at least one occupant is one of a plurality of occupants of the transporter, and wherein the at least one occupant is provided with an individual augmented reality experience unique to the at least one occupant.

20. The system of claim 19, further comprising a head-up display (HUD) system installed on the transporter, the HUD system configured to provide the at least one occupant of the transporter with the augmented sensory perspective.

21. A method for providing an augmented reality experience, the method comprising:
- providing a venue including a mapped physical space;
- controlling progress of a transporter through the mapped physical space, the transporter configured to transport at least one occupant through the mapped physical space along a known path;
- generating a virtual venue including a virtual representation of the mapped physical space;
- monitoring real events occurring in the venue;
- recording virtual events occurring in the virtual venue; and
- selectively combining the real events and the virtual events to provide the at least one occupant of the transporter with an augmented sensory perspective;
- wherein the at least one occupant is one of a plurality of occupants of the transporter, and wherein the at least one occupant is provided with an individual augmented reality experience unique to the at least one occupant.

22. The method of claim 21, further comprising providing a head-up display (HUD) system installed on the transporter, the HUD system configured to provide the at least one occupant of the transporter with the augmented sensory perspective.

* * * * *